United States Patent [19]

Druin et al.

[11]  4,229,340
[45]  Oct. 21, 1980

[54] GLASS FIBER-REINFORCED POLYETHYLENE TEREPHTHALATE/POLYAMIDE BLENDS

[75] Inventors: Melvin L. Druin, West Orange; John S. Gall, North Haledon, both of N.J.

[73] Assignee: Celanese Corporation, New York, N.Y.

[21] Appl. No.: 70,223

[22] Filed: Aug. 27, 1979

[51] Int. Cl.² .......................... C08K 7/14; C08L 67/02
[52] U.S. Cl. .............. 260/40 R; 260/37 N; 525/425
[58] Field of Search ........... 260/40 R, 37 N; 525/425

[56] References Cited

U.S. PATENT DOCUMENTS

| | | | |
|---|---|---|---|
| 3,686,069 | 8/1972 | Winkler et al. | 525/425 X |
| 3,812,077 | 5/1974 | Hobbs | 260/40 R |
| 3,814,725 | 6/1974 | Zimmerman et al. | 260/40 R |
| 3,903,042 | 9/1975 | Gall | 525/425 X |
| 3,936,413 | 2/1976 | Würmb et al. | 260/40 R |
| 4,008,199 | 2/1977 | Gall | 525/425 X |
| 4,013,613 | 3/1977 | Abolins et al. | 260/40 R |
| 4,024,204 | 5/1977 | Schlichting et al. | 525/425 X |
| 4,066,587 | 1/1978 | Mains et al. | 525/425 X |
| 4,097,445 | 6/1978 | Martins et al. | 260/40 R |
| 4,111,892 | 9/1978 | Kamada et al. | 525/425 X |
| 4,141,882 | 2/1979 | Kodama et al. | 260/40 R |
| 4,145,372 | 3/1979 | Murray et al. | 525/425 X |

*Primary Examiner*—Sandra M. Person
*Attorney, Agent, or Firm*—John A. Shedden; K. A. Genoni; T. J. Morgan

[57] ABSTRACT

An improved thermoplastic nylon molding resin comprising intimately mixed nylon molding resin and glass reinforcing agents in the presence of polyethylene terephthalate resin.

6 Claims, No Drawings

GLASS FIBER-REINFORCED POLYETHYLENE TEREPHTHALATE/POLYAMIDE BLENDS

The present invention relates to the products and process for preparing improved thermoplastic molding resins. More specifically, this invention describes improved reinforced nylon polymers.

Reinforced nylon polymers provide increased strength properties in molded articles. There is continual search to provide improvements over the non-reinforced nylon molding resins.

It has now been discovered that improved thermoplastic glass reinforced nylon polymers are provided by the incorporation of specific polyethylene terephthalate resins in these compositions. The compositions of this invention provide improved physical properties over those of the individual glass reinforced resins.

Various specific combinations of polyamide and polyalkylene terephathalate resins have been disclosed in recent years in the search to find improved resin combinations.

U.S. Pat. No. 3,903,042 discloses the use of polyamides in a concentration of from about 0.25 percent by weight to about 1.0 percent by weight to heat stabilize, i.e., retain tensile strength under high temperature conditions, reinforced polypropylene terephthalate and polybutylene terephthalate molding resins.

U.S. Pat No. 4,008,199 discloses an improvement in the above described stabilization patent by adding to the reinforced nylon/polypropylene terephthalate or polybutylene terephthalate blend a phenoxy resin and an organic phosphonate.

U.S. Pat. No. 3,812,077 teaches the use of nucleating agents coated on glass fibers in a resin matrix. In this manner, nucleating polymer crystallites are oriented in planes perpendicular to the reinforcing agents axis thereby lending additional strengths to the reinforcing fiber. One of the combinations disclosed is the use of a polyethylene terephthalate coating on glass fibers embedded in a nylon matrix which yields increased tensile and flexural strengths.

U.S. Pat. No. 4,013,613 teaches that rapidly crystallizing reinforced polyesters—specifically excluding polyethylene terephthalate—can have certain properties improved by the addition of other polymers. The broad statement "other polymers" is described as normally crystalline, amorphous, or normally partially crystalline polymer which comprise a mixture of a polymerization product of an ethylenically unsaturated monomer and at least one difunctionally reactive compound which is polymerizable by oxidation in a concentration of from about 1 to 99 parts of the total resin.

We have discovered that with the addition of the slowly crystallizing polyethylene terephthalate resin to glass reinforced polyamides, with a fairly narrow concentration band, the physical property levels of the resulting composition are significantly increased over those of the glass reinforced polyamide alone.

The linear polyamide as utilized herein is meant to include synthetic linear polyamides which can be prepared from polyamide-forming monomers such as monoaminocarboxylic acids, their amide-forming derivatives, or from suitable diamines and suitable dicarboxylic acids or amide-forming derivatives of these compounds. The polyamides produced having recurring amide groups as an integral part of the main polymer chain and the recurring intra-linear carboamide groups in these polyamides are separated by hydrocarbon groups containing at least two carbon atoms. Synthetic linear polyamides which can be prepared according to the method of this invention are all those of the nylon type having a relative viscosity between 35 and 100, and preferably between 45 and 65, as measured in a solution of 2.75 grams of the polyamide in 25 milliliters of 90 percent formic acid.

Preparation of such polymers is typically illustrated in U.S. Pat. Nos. 2,071,200; 2,071,253; 2,130,948; 2,285,009; 2,361,717; 2,512,606; 3,193,535; and 3,431,236 among others.

Particular polyamides which can be prepared according to the method of this invention include, among others, polyhexamethylene adipamide, polyhexamethylene sebacamide, polymerized 6-aminocaproic acid, polytetramethylene adipamide, polytetramethylene sebacamide, and polyadipamides prepared from di (4-aminocyclohexyl) ethane or 1,6-di (4-aminocyclohexyl) hexane as the diamine component.

The preferred polyamides used in this invention include: nylon 6, nylon 66, nylon 610, nylon 11 and nylon 12. These are commercially available polymers and their methods of preparation are described in the Encyclopedia of Chemical Tehchnology, vol. 10, pages 924–928, Interscience Publishers Inc., N.Y.C. (1953). Other polyamides which fall within the ambit of this invention include both those made from amino acids or the corresponding alicyclic lactams as well as those made from salts of diamines and dibasic acids.

The term "polyethylene terephthalate," (PET) as used herein, is either a polymer obtained from terephthalic acid and ethylene glycol, or a copolymer predominantly of the foregoing polymer, or a mixture consisting of polyethylene terephthalate, a copolymer predominantly thereof and not more than 10 mol percent of other resins. Accordingly, what is referred to as polyethylene terephthalate in the present invention comprehends all the foregoing substances. To be sure, those resins which hinder the improvement in the properties or additions of resins in amounts which likewise hinder these improvements are naturally excluded.

The intrinsic viscosity of the polyethylene terephthalate resin as measured by an 8% solution in 0-chlorophenol at 25° C. is form about 0.2 to about 1.0 dl/g, preferably from about 0.45 to about 0.9 dl/g.

The polyethylene terephthalate resin can be added to the reinforced nylon resin in a number of ways, e.g., (1) by blending it with the reinforcing agent prior to its intimate blending with the nylon resins, (2) by simultaneously intimately mixing with the reinforcing agent and the nylon resins and (3) by blending with the nylon polymer and then intimately blending with the reinforcing agents. Other mixing techniques can be used.

The amount of PET resin incorporated can range from about 1.0 to about 50 weight percent preferably from about 2.0 to about 40 weight percent, most preferably from about 2.5 to about 30 and ideally from about 2.5 to about 20 weight percent of the total thermoplastic resin.

The glass reinforcing agents as utilized herein which provide increased strength to the molded product can be intimately mixed by either dry blending or melt blending, blended in extruders, heated rolls or other types of mixers. If desired, the reinforcing agents can be blended with the monomers in the polymerization reaction as long as the polymerization reaction is not affected. The type of glass fillers which can be used include among others, chopped glass fibers or continuous rovings, etc. The amount of reinforcing agent can range from about 2 to about 60 weight percent, preferably 5 to 60 weight percent based on the total molding composition.

The following examples will serve to illustrate the invention without limiting the same.

EXAMPLE I

Polyhexamethylene adipamide (nylon 66) molding resin having a relative viscosity of 50 is tumble blended with glass fibers (PPG 3531—⅛ inch length) and then extrusion blended by force feeding through a 2½ inch two-stage single screw extruder with 20-25 inches of vacuum and a strand die. The screw speed is 85 r.p.m. and the barrel temperature profile of the extruder and die are set to give a 540° F. melt temperature. Tensile test bars were produced on a 5 oz. Reed injection moding machine with the following conditions:

Melt temperature—540° F.
Screw speed—medium
Mold temperature—200° F.
Plunger forward—12 sec.
Mold closed—8 sec.
Delay—1 sec.

PET (undried and containing 0.55% volatiles) can be added in the tumble blender or in the extrusion blender.

The tests for the properties in this invention are all carried out in accordance with the following methods: ASTM numbers D648-72; D256; D638; and D790.

The two sets of results in Table I which are typical of the property values realized in the instant invention utilize 33 weight percent glass fibers (⅛ inch length) based on the total composition intimately mixed with nylon 66 molding resin in the presence of varying amounts of polyethylene terephthalate.

ing of property values shows no significant difference due to the annealing step.

EXAMPLE II

Polyhexamethylene adipmaide (nylon 66) molding resin having a relative viscosity of 50 is tumble blended with WollastoKup 325 (A-1100)—a reinforcing mineral filler. [WollastoKup is a trademark of Interpace Corp. for a surface treated Wollastonite.] This composition is then extrusion blended by force feeding it through a 2½ inch two-stage single screw extruder with 20-25 inches of vacuum and a strand die. The screw speed is 85 r.p.m. and the barrel temperature profile of the extruder and die are set to give a 540° F. melt temperature. The strands are chopped in a rotary chopper to ⅛″ lengths.

Sample bar molding procedures and PET addition are as in Example I.

The results in Table II which are typical of the property values realized utilize about 40 weight percent WollastoKup 325 (A-1100) based on the total composition intimately mixed with nylon 66 molding resin in the presence of varying amounts of polyethylene terephthalte.

TABLE II

| Nylon/PET [40 wt % Wollastokup 325 (A-1100)] | | | | |
|---|---|---|---|---|
| | 100/0 | 80/20 | 70/30 | 60/40 |
| Tensile Strength, psi | 13,500 | 12,800 | 12,800 | 12,400 |
| Notched Izod, ft.-lbs/in | .8 | .7 | .6 | .6 |
| Elongation | 5.0 | 3.4 | 3.1 | 2.6 |
| Flexural Strength, psi | 23,800 | 21,600 | 20,700 | 19,300 |
| Flexural Modulus, psi × $10^{-6}$ | .82 | .85 | .89 | .94 |
| Heat Distortion Temperature, °C. at 264 psi | 201 | 120 | 101 | 98 |
| Gardner Impact, ft-lbs/in, $F_{50}$ | 6.7 | 4.4 | 3.0 | 2.3 |

Table II shows a comparison of the physical proper-

TABLE I

| | | \multicolumn{8}{c}{Nylon/PET (33 wt % glass)} | | | | | | | |
|---|---|---|---|---|---|---|---|---|---|
| | | 100/0 | 97.5/2.5 | 95/5 | 90/10 | 80/20 | 70/30 | 60/40 | 0/100 (± 5% est.) |
| Tensile strength | (1) | 24,500 | 27,700 | 27,500 | 27,700 | 26,600 | 26,900 | 22,900 | 23,300 |
| psi | (2) | 26,700 | | 28,100 | 27,700 | 27,500 | 26,400 | 25,100 | 22,300 |
| Notched Izod | (1) | 2.1 | 2.3 | 2.2 | 2.3 | 1.8 | 1.8 | 1.7 | 1.3 |
| ft-lb/in. notch | (2) | 1.9 | | 2.2 | 2.1 | 1.8 | 1.6 | 1.5 | 1.3 |
| Elongation | (1) | 3.1 | 3.4 | 3.7 | 3.5 | 2.9 | 2.7 | 1.8 | 2.0 |
| (percent) | (2) | 3.9 | | 3.6 | 3.5 | 3.2 | 2.8 | 2.5 | 2.0 |
| Flexural Strength | (1) | 36,500 | 42,500 | 42,200 | 42,100 | 39,300 | 39,000 | 33,200 | 32,000 |
| psi | (2) | 41,300 | | 42,300 | 42,200 | 41,000 | 37,200 | 34,800 | 32,000 |
| Flexural modulus | (1) | 1.27 | 1.32 | 1.28 | 1.36 | 1.36 | 1.44 | 1.49 | 1.55 |
| psi × $10^{-6}$ | (2) | 1.23 | | 1.29 | 1.33 | 1.33 | 1.35 | 1.31 | 1.55 |
| Heat Distortion Temp. | (1) | 251 | 256 | 256 | 255 | 249 | 250 | 246 | 224 |
| @ 264 psi, °C. | (2) | 253 | | 252 | 255 | 251 | 249 | 244 | 224 |
| Gardner Impact, in-lbs, $F_{50}$ | (2) | 9.6 | | 11.6 | 10.7 | 7.7 | 3.9 | 3.4 | — |

Table I shows a comparison of physical properties of nylon/PET blends, 33% glass filled. Note the significant and unexpected increase in property values realized over either glass filled nylon or PET resin alone especially when from about 2.5 to about 10 percent by total resin weight PET is present.

Particular note should be made of the fact that at low levels (2.5 to about 10%) PET in nylon, the Notched Izod is higher than for nylon without PET. These higher values are not due to the PET being amorphous, for when samples produced similarly to those in Table I are annealed at 165° C. for one hour,—conditions which would cause the PET to crystallize—a remeasurties realized with 40% WollastoKup filled nylon/PET blends. Note that in contrast to the surprising increase in physical properties achieved when glass reinforced nylon in blended with PET, a reduction in properties occurs when a mineral filler is utilized as the reinforcing agent and the PET level is increased vis-à-vis nylon.

Thus, the above results demonstrate that with a glass reinforced nylon composition-as opposed to a mineral filled nylon composition—blending from about 1.0 to about 50 weight percent based on the total resin weight of polyethylene terephthalate—a resin with lower physical property values than nylon—can achieve glass reinforced molding compositions with physical property values improved over that of glass reinforced nylon alone.

What is claimed is:

1. An improved thermoplastic molding resin comprising a synthetic linear polyamide polymer having a relative viscosity in the range of from about 35 to about 100; from about 5 to about 60 weight percent based on the total composition of glass fiber reinforcing agent; and from about 1.0 to about 50 weight percent based on the total resin weight of polyethylene terephthalate.

2. The product of claim 1 wherein the polyamide polymer is polyhexamethylene adipamide having a relative viscosity in the range of from about 45 to about 65.

3. The product of claim 2 wherein the polyethylene terephthalate is present from about 2.0 to about 40 weight percent based on the total resin weight and has an intrinsic viscosity of from about 0.45 to about 0.9 dl/g.

4. The product of claim 3 wherein the polyethylene terephthalate is present from about 2.5 to about 30 weight percent based on the total resin content.

5. The product of claim 3 wherein the polyethylene terephthalate is present from about 2.5 to about 20 weight percent based on the total resin content.

6. A process for producing an improved thermoplastic molding resin wherein a synthetic linear polyamide polymer having a relative viscosity in the range of from about 35 to about 100 is intimately mixed with about 5 to about 60 weight percent of the total molding composition of glass fiber reinforcing agent and from about 1.0 to about 50 weight percent based on the total resin of polyethylene terephthalate having an intrinsic viscosity of from about 0.2 to about 1.0 dl/g.

* * * * *